United States Patent [19]
Boillet

[11] Patent Number: 5,906,119
[45] Date of Patent: May 25, 1999

[54] PROCESS AND DEVICE FOR MELTING GLASS

[75] Inventor: Jacques Boillet, Compiegne, France

[73] Assignee: Saint-Gobain Vitrage, Courbevoie, France

[21] Appl. No.: 08/641,589

[22] Filed: May 1, 1996

[51] Int. Cl.$^6$ ................................. F27B 3/22; C03B 5/42
[52] U.S. Cl. ...................... 68/134.4; 65/135.7; 65/136.3; 65/347; 432/196
[58] Field of Search ................................. 65/134.1, 134.4, 65/135.7, 136.3, 346, 347; 432/195, 196

[56] References Cited

U.S. PATENT DOCUMENTS

| | | | |
|---|---|---|---|
| 3,592,623 | 7/1971 | Shepherd | 65/134.4 |
| 4,911,744 | 3/1990 | Petersson et al. | 65/134.4 |
| 5,346,524 | 9/1994 | Shamp et al. | 65/134.4 |

FOREIGN PATENT DOCUMENTS 335 728  10/1989  European Pat. Off. .

*Primary Examiner*—Stanley S. Silverman
*Assistant Examiner*—Sean Vincent
*Attorney, Agent, or Firm*—Pennie & Edmonds LLP

[57] ABSTRACT

A process and a device for melting glass. According to the invention, the melting of vitrifiable materials is performed in a melting compartment by at least one fuel burner, the combustive material being formed mainly by essentially pure oxygen, at least 50% of the combustive material necessary for the desired combustion being supplied separately to the melting compartment by at least one oxygen lance.

16 Claims, 2 Drawing Sheets

PROCESS AND DEVICE FOR MELTING GLASS

BACKGROUND

The invention relates to a process and a device for melting glass starting with vitrifiable materials, a device more commonly called a melting furnace, continuously to feed melted glass to forming equipment for flat glass such as rolling or float equipment, or for hollow or cut glass like numerous forming machines, or for insulation glass (glass wool, rock wool), or for glass for reinforcement fibers or even special glass for television screens or others.

The invention can be applied to all types of melting furnaces having production capacities for melted glass that can range, for example, from batches of 10 tons/day up to 1,000 tons/day and more.

This type of furnace usually consists, as is known, of a series of compartments emptying into one another and each having specific functions and dimensions. The furnace must indeed be able to melt vitrifiable materials and guarantee the chemical and thermal homogeneity of the glass once it is melted.

Furnaces can be placed in two broad categories according to the heating method used to melt the vitrifiable materials in the melting compartment:

on the one hand, there are electric melting furnaces, called "cold vault," where melting is performed by electrodes that are immersed in the depth of the melted glass, which is known, for example, from patent EP-B-0-304 371.

On the other hand, there are draft furnaces, also called regenerative furnaces, known notably from U.S. Pat. No. 4,599,100. In this case, the heating power is provided by two rows of burners generally operating with a fuel/air mixture, and in alternation; the combustion gases then alternately reheat one or the other of the two regenerators placed opposite one another on both sides of the melting compartment and connected to the latter. The combustion gases are thermally exhausted by stacks of refractories that comprise these regenerators, refractories that then return the heat thus stored to the melting compartment. This method of heating is efficient and widely used, although it is not without certain inherent drawbacks. Thus the energy cost of fuel/air burners is relatively high. Besides, the operating system of burners that are "activated" alternately with cycles on the order of 15 to 60 minutes is not the most simple to control rigorously and can cause a discontinuity in continuous manufacturing and the equilibrium of the temperatures is affected. Their use further leads to introducing, into the melting compartment, a significant amount of air, thus of nitrogen, from which there is an increased risk of seeing form a certain amount of polluting gases of the $NO_x$ type that must then be treated.

Further, the large amount of special and costly refractories necessary for manufacturing regenerators significant raises the price of construction of the furnace.

The object of the invention is thus to mitigate the drawbacks connected with the use of draft furnaces by proposing a new type of draft heating that greatly reduces the energy cost and the material cost for construction of the furnace, that simplifies its operating method, while guaranteeing that melted glass of at least as high a quality is obtained.

The invention also has the object of reducing the wear of the refractories comprising the walls of the furnace and thus of increasing the lifetime of the furnace.

The object of the invention is a furnace for melting vitrifiable materials, a furnace comprising a melting (or melting/refining) compartment for glass equipped, in the upstream part, with at least one opening intended to be fed with vitrifiable materials with the help of charging devices placed opposite said opening. In the downstream part, said melting compartment comprises at least one exit opening for melted glass emptying into one or more successive downstream compartments intended to convey melted glass toward the forming zone. According to the invention, the melting of vitrifiable materials is performed, in the melting compartment, essentially by at least one fuel oil and/or gas burner, the combustive material being formed mainly of essentially pure oxygen, at least 50% of the combustive material necessary for the desired combustion being supplied separately by at least one oxygen lance. Essentially pure means, according to the invention, at least 80% and preferably at least 90% oxygen. Separately means separate arrival points for the fuel oil and/or gas on the one hand and for the oxygen on the other hand. Fueled intended for use with the operation of the burners are those typically used for glass melting furnaces including fuel oil and gas.

In the framework of the invention, the terms "upstream" and "downstream" refer to the overall direction of flow of the melted glass through the furnace. Melting compartment means the melting compartment and the melting/refining compartment.

To choose, according to the invention, a method of heating combining burners and oxygen lances supplying at least 50% of the oxygen separately indeed offers a whole series of advantages compared to more conventional burners operating notably with an air-type combustive material, or even compared to oxygen burners supplied with a stoichiometric amount of oxygen.

This method of heating with oxygen makes it possible to eliminate, first of all, the traditional operation by "inversion" for draft furnaces: the oxygen burners can maintain a constant operating regime over time, which makes the use of the furnace simpler, this continuous operation is more regular and makes it possible to have much more fine adjustments than with operation by inversion. Especially the presence of regenerators made of stacks of costly refractories, susceptible to wear, can be completely eliminated. The oxygen burners thus are able to heat the vault of the melting compartment and the so-called "heating chamber" volume between said vault and the plane of melted glass, continuously and without having to use regenerators.

The atmosphere that prevails above the plane of the glass in the melting compartment is much more stable and controlled, which can prove to be significant for the production of so-called special glasses.

Further, the thermal efficiency of this type of burner is notably higher than that of conventional burners operating with an air-type combustive material, because of the absence of nitrogen, which considerably decreases the volume of fumes generated. Thus considerable reductions in energy cost are obtained overall, and this type of burner makes it possible also to envision considerable increases in the specific draw of the furnace.

The fact that the burners chosen according to the invention introduce a very small amount, almost none, of air into the melting/refining compartment very greatly reduces the possibilities for forming $NO_K$ type polluting gases, making it all the more less costly to treat the combustion gases exhausted from the compartment.

Further, always with respect to conventional burners, the oxygen burners make it possible to introduce, into the melting compartment, a much smaller volume of gas and, similarly, the volume of gas resulting from the combustion is likewise greatly reduced as already mentioned. This means that it can be envisioned to reduce the volume of the so-called "heating chamber" mentioned above, notably, for example, by slightly lowering the vault of the melting compartment which, here again, tends to reduce simultaneously the energy cost and the construction cost of the furnace itself.

Everything, thus, in using oxygen burners operating without inversion contributes to achieving a more reliable furnace, less costly in its design and one that makes it possible to have energy savings that can go up to well beyond 15% with respect to a conventional draft furnace of similar dimensions.

However, when essentially pure oxygen is used as a combustive material in fuel oil and/or gas burners with so-called stoichiometric amounts, the flame temperature obtained at the plane of the exit of the burners is higher than the flame temperature using air as the combustive material. A rapid deterioration of the refractories comprising the walls of the furnace, notably around the tip of the burners, can thus result.

An object of the invention is thus a process for melting vitrifiable materials in a melting compartment, continuously to feed melted glass to glass forming equipment in which the melting of vitrifiable materials is performed essentially by the combustion of a fuel oil and/or gas mixture with essentially pure oxygen, the supply of fuel oil and/or gas to the melting compartment being performed at least at one point that has a deficiency of oxygen with respect to stoichiometric amounts, at least 50% of the oxygen corresponding to the total combustion being supplied separately at least at one different arrival point.

This supply of at least 50% of the oxygen necessary for total combustion by at least one different arrival point and preferably by several different arrival points further yields a greater flexibility for regulating the temperatures in the melting compartment, the zones(s) of the compartment where the oxygen is supplied generally corresponding to the point at which it is desired to control the temperature level.

Further, the feed of the burners with a deficiency of oxygen, according to the invention, and the supply of oxygen, in combination, by wisely distributed oxygen lances, notably makes it possible to have a controlled flame temperature called "low temperature, low $NO_x$ flame." Further, the fact of inserting oxygen between the flame and the walls of the furnace assures an oxidizing atmosphere at the walls. The flame is also at a distance from the walls and thus the phenomenon of exudation and attack on the refractories in their vitreous phase is decreased.

The combination of oxygen burners fed with a deficiency of oxygen and oxygen lances results in a better distribution of the flame over the mixture and the glass bath. This better distribution of the flame makes it possible to lower the vault temperatures and to increase the temperatures of the bottom. Finally, this makes it possible likewise to envision increases in the specific draw of furnaces of 10 to 30%.

As indicated above, the supply of oxygen by burners on the one hand and by oxygen lances on the other hand, is made thus with 0 to 50% only by burners and the rest, to 100% of the oxygen necessary for combustion, by oxygen lances.

Preferably, the oxygen supply is made with at least 80% separately by the oxygen lances.

Finally, all or essentially all the oxygen can be advantageously supplied separately. Thus any incident at the tip of the injector (burner) in the case of fouling or run-out, in particular in the case of special glasses, is avoided. All or essentially all the oxygen is meant to mean 100 to about 95% of the oxygen.

According to one of the characteristics of the invention, the flame of a burner is fed by successive feeds of oxygen to the flame and at certain locations in the furnace to have the desired flame temperature.

However, the very favorable assessment described above would be compromised if, contrary to the invention, the entry of air into the melting compartment, coming from downstream compartments, were not avoided. In the opposite case, indeed, the risk is run of recreating a certain amount of $NO_x$ type polluting gases in the melting compartment and the saving realized in terms of energy in this compartment is decreased considerably. The arrival of air can be prevented with the help of sealing means for the gases of the melting/refining compartment with respect to the rest of the furnace. The or these means of sealing thus "insulate" the atmosphere prevailing above the glass melted in the melting compartment from the atmosphere of the successive downstream compartment(s) that are adjacent to it. These "downstream" compartments are intended to condition the glass, i.e., are essentially intended to progressively cool it until it reaches its forming temperature, to perfect its chemical and thermal homogeneity and to eliminate foreign bodies of the unmelted type or particles of refractory material. Now this thermal conditioning can be performed in one or the other of these so-called downstream compartments by using, as is known, alternatively or in combination, reheating means, for example conventional fuel-air burners, and cooling means that introduce the air in a large amount at ambient temperature into these compartments. Thus it is necessary to prevent these types of gases from "returning" toward the melting/refining compartment so they do not disturb its very controlled atmosphere.

Of course if the downstream compartment(s) are designed so that, for example, they use cooling means without the introduction of air, and have an atmosphere not composed of air, these sealing means are no longer indispensable.

According to an embodiment of the device according to the invention, the burners or injectors are distributed in rows by being alternated with oxygen lances in the upstream and/or downstream wall, and or the lateral walls parallel to the glass bath, with a number and an inclination of +5 to −15 degrees, depending on the structure and dimensions of the furnace, and on the position with respect to the glass bath. The burners and oxygen lances empty into the melting/refining compartment through superstructure walls whose sections can be very reduced and do not alter the thermal insulation of the unit. The burners can be independent or gathered in groups of burners whose heating power is regulated independently from one group to the next. The groups are placed essentially perpendicular to the axis of the furnace on the lateral walls and essentially parallel to the furnace on the upstream and downstream front walls, with the possibility each time of being oriented from 0 to 20 degrees with respect to these axes and to the horizontal plane. The heating can be modulated and regulated in an optimal way in the entire melting/refining compartment and can achieve all the desired temperature profiles, according to the types of melted glass and fabrication. Other arrangements of burners and oxygen lances are of course possible.

There can be provided, in the melting/refining compartment, mechanical means of the babbling type to accelerate the convection or auxiliary heating means of the type where electrodes are immersed in the glass to adjust or correct the temperature profile.

The fact of having eliminated the recuperator or the regenerators reduces the number of openings, frees the entrance and the space around the furnace, which makes it possible better to insulate it and facilitates its maintenance.

To recover, to the maximum, the heat energy from the fumes coming from the combustion of the burners in the melting compartment, preferably the exhaust openings are placed behind the openings for feeding the vitrifiable materials, the fumes following a path from the center of the furnace toward the walls (making a screen between the flame and the walls) to return from downstream toward the upstream to enter above the charging zone where the vitrifiable materials are floating on top, which can thus advantageously be preheated.

Several positions can be adopted for the feed opening(s) for vitrifiable materials. The latter can be made, on the one hand, in the one or two lateral walls, on the other hand, in the front wall of the melting compartment.

An advantageous solution can be two symmetrical openings opposite one another in the lateral walls.

It is possible to provide the auxiliary exhaust openings for the fumes either in the upstream front wall or in the lateral walls of the melting/refining heating chamber.

These fumes, once they exit the heating chamber of the furnace, are still relatively hot, it can be provided to convey them into heat recovery devices or devices for preheating vitrifiable materials before they are charged. They can still be used to preheat oxygen.

Another advantage of the invention using the combination of gas and/or fuel oil burners (or injectors), fed with a deficiency of oxygen, this deficiency being able to be total, and oxygen lances, is a more flexible regulation of the flame and notably a regulation of its position with respect to the glass mixture, the flame being drawn toward the location where the oxygen is supplied.

This advantage, notably, makes it possible to design variants of the device according to the invention in the arrangement of burners and oxygen lances.

Separate supply of oxygen generally means, according to the invention, a supply of oxygen at one or more points that are at least 5 cm and preferably at least 10 cm away from the point at which the fuel oil and/or gas is supplied, i.e., from the tip of the burner. The oxygen can advantageously be supplied at two points around each burner, and preferably at a level lower than the level at which the fuel oil and/or gas is supplied.

Thus the invention envisions likewise a unit that can be used in the heating system combining burner and oxygen lances according to the invention. This unit comprises a refractory block equipped with a passage for emplacing a burner, this passage being flared notably in the form of a truncated cone toward the face intended to be oriented toward the interior of the furnace, and two passages placed at equal distances and at more than 5 cm and preferably at more than 10 cm from the axis of the burner passage, these two passages intended for the emplacement of two oxygen lances being further located at a level lower than the level of the burner. The unit can be equipped with a burner and with two oxygen lances.

This arrangement of oxygen lances with respect to the burner makes it possible regulate the flame very well while notably avoiding excessive heating of the refractory where the burner tip is located.

Other characteristics and advantages of the invention come out of the following description with the help of the figures that represent:

DETAILED DESCRIPTION OF THE INVENTION

Figure 1:
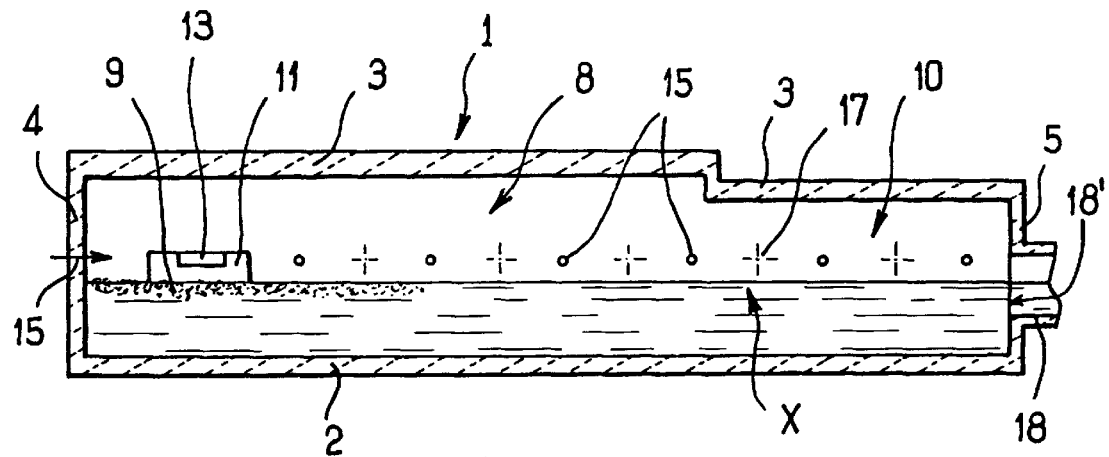
FIG. 1, a view in a lengthwise section of a furnace according to the invention, FIG. 2, a plan view of this furnace, FIG. 3, a possible way of operating a furnace according to the invention, FIG. 4 and 5, a unit comprising a refractory block and a burner/oxygen lance combination according to the invention.
Figure 2:
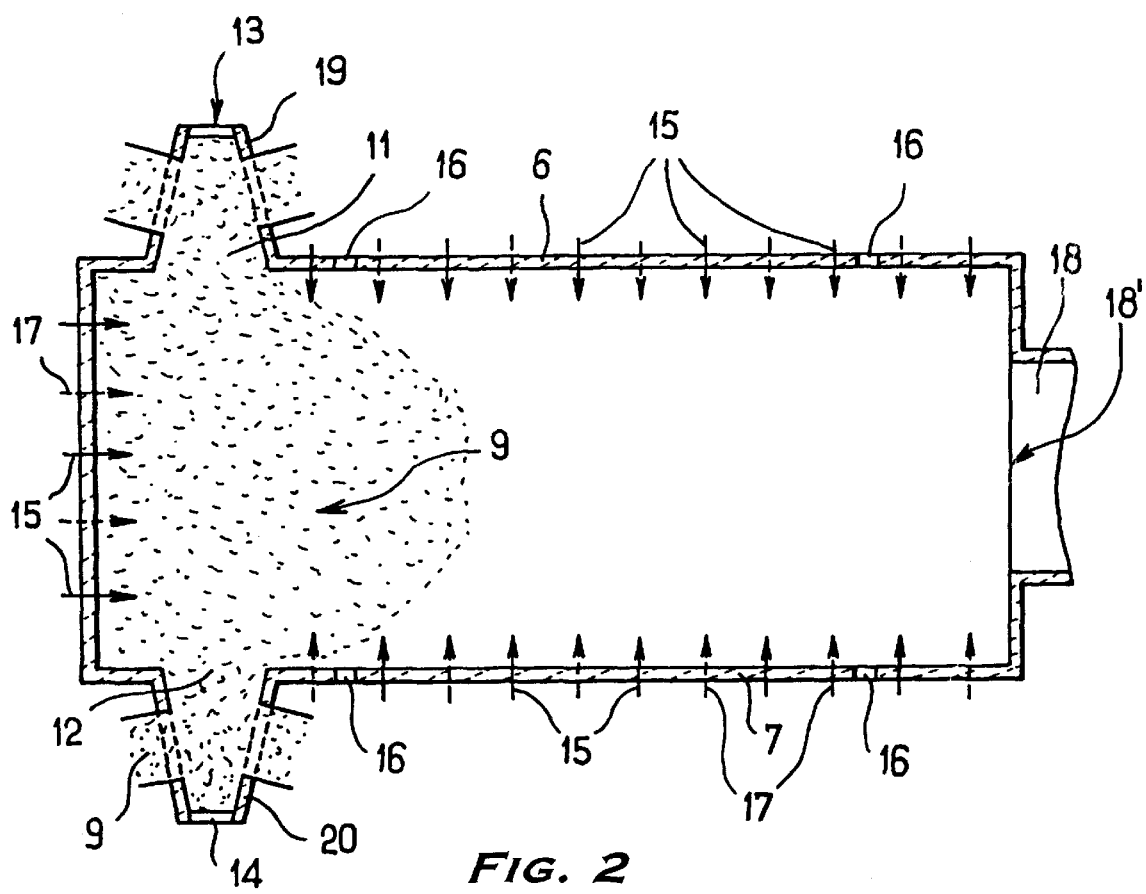

FIGS. 1 and 2 diagrammatically represent melting/refining compartment 1 of the melting furnace according to the invention. This compartment is delimited by a bottom 2, a vault 3, upstream walls 4, downstream walls 5, and lateral walls 6–7. The level of the melted glass is indicated in FIG. 1 by horizontal line X. The glass runs toward the downstream compartment by narrow passage 18.

This furnace comprises two main zones:

melting zone 8 where vitrifiable materials 9 are charged, floating on top of the melting glass, zone 10 for melting/refining, this zone is delimited by a lower vault 3, which makes it possible notably to increase the refractory.

In this embodiment, a method of lateral charging of the vitrifiable mixture is provided in zone 8. Of course, other embodiments according to the invention can use a front method of charging.

The feed opening represented in FIGS. 1 and 2 consists of two symmetrical openings 11 and 12 that connect the melting compartment to two attachments 19, 20 in which the charging with vitrifiable material is performed, on both sides in this example.

Openings 13, 14 for exhausting the combustion fumes are provided behind feed openings 11, 12. The fumes are thus forced to follow an exhaust path from the center of the furnace, going along the walls and the vault, and hanging over the yet unmelted vitrifiable materials, which improves the energy yield of the furnace.

The fumes can then be used to feed any heat recovery device, or in a preheating system for vitrifiable materials. Auxiliary openings 16 for exhausting the fumes can also be provided in the front and lateral walls.

In all the walls: front, lateral, downstream, small openings are made to introduce injectors 15 or burners represented in the figures by a solid arrow, oxygen lances 17 represented by a dashed arrow. The burners and oxygen lances are placed above the plane of the glass to form groups, or individually to mark a hot point and to achieve an optimal distribution of the thermal exchange between the flames and the glass bath; each group of burners or independent burner can be regulated by heat power independently, which makes it possible to obtain the desired temperature profile at any point and at any moment. Further, the oxygen lances are placed at various locations on the walls to accompany the flame and to make it so that, along the distance covered by the flames, there is no over-oxygenation resulting in too hot a flame or, in contrast, a lack of oxygen, which results in a reduced flame. Indeed, in the two cases, a premature wear of the refractories of the furnace can occur.

The use of burners and oxygen lances functioning continuously assures a thermal yield clearly higher than that of conventional burners by using an amount of combustive material that is reduced with respect to the air, which results in a volume of fumes that is reduced by about 80%. The design of the melting/refining heating chamber can be reduced in volume without counterindication for the operation of the furnace, resulting in a savings in construction material for the furnace. Likewise, the burners and oxygen lances do not introduce any air, thus no nitrogen, into the furnace, which prevents the formation of $NO_x$-type polluting gases. The separate oxygen feed for the burners prevents a deterioration of the refractories, notably at the tip of the burners.

To guarantee the advantages of all the oxygen it is necessary to eliminate any introduction of air into the melting/refining compartment. It is necessary that all the openings between the heating chamber and the exterior be closed (expansion joint, draft holes, etc.).

Further, the exit(s) for the glass from the melting/refining compartment toward the forming compartments are made so that there are no recirculation belts for the melted glass between the melting/refining zones and the feed zones for the working compartments, nor any atmospheric exchange. To do this, known feeding and sealing means are used: feed by throat and channel, feed by channel with hanging or immersed barrier, feed by channel with suspended screen and barrier. Such feed or sealing means is shown schematically at 18' in FIGS. 1 and 2.

The heating system according to the invention makes the use of the furnace more reliable with less costly fabrication. It achieves a constancy of the atmosphere in the melting compartment that, with adequate refractories, makes it possible to increase the lifetime of the furnace. Indeed, the temperature variations are one of the causes of wear of the refractories. Further, atmospheric pollution is greatly decreased.

Thus, for example, the heating system according to the invention makes it possible to lower the temperature of the vault of the furnace by about 50 to 80° C., and to increase its bottom temperature by about 10 to 20° C. with respect to known systems for a given melting temperature. Further, the temperature at the tip of an oxygen burner is decreased by about 60° C. thanks to the separate oxygen feed.

Figure 3:
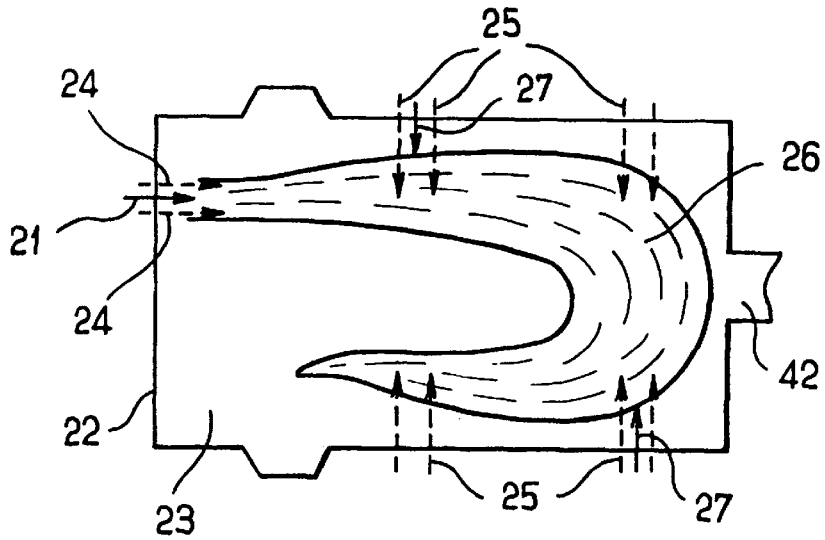

FIG. 3 represents diagrammatically the operation of a heating system according to the invention for an end-fired furnace.

A burner 21 fed with fuel oil and/or gas, but essentially without oxygen is placed in upstream wall 22 of furnace 23. Part of the oxygen necessary for combustion is supplied by two oxygen lances 24 placed around burner 21 in the upstream wall. The amount of oxygen supplied by these two lances corresponds to about 20 to 40% of the oxygen necessary for combustion.

Other oxygen lances 25 are placed in the walls of the furnace. Four pairs of lances 25 are represented here. Each of these pairs supplies about 15 to 20% of the necessary oxygen. Thus the oxygen is supplied accompanying flame 26 along its path so as to have a flame that is neither too hot nor too cold.

When it is desired to increase the draw of the furnace, other burners 27 can be placed between pairs of oxygen lances 25 and likewise the oxygen supply can be increased by these lances and/or other additional lances. The melted glass is removed by exit 42 toward the downstream compartment.

Figure 4:
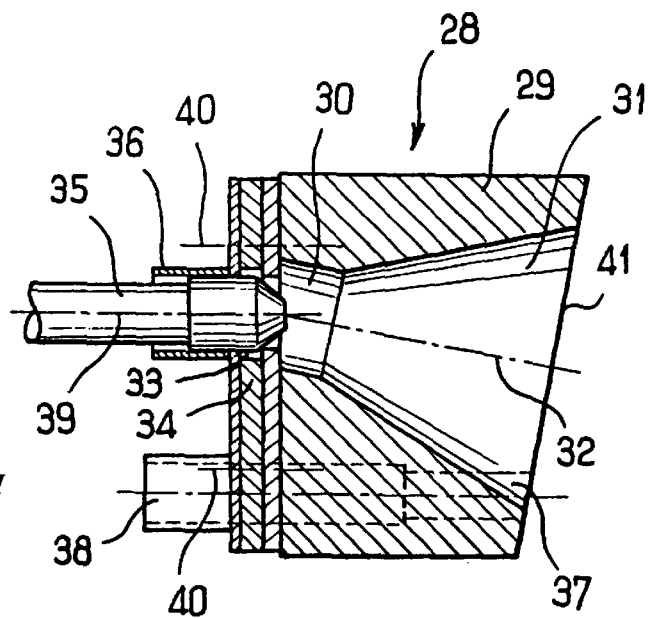
Figure 5:
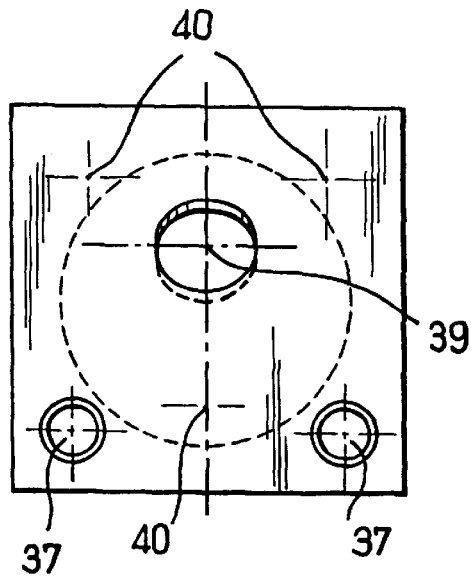

FIGS. 4 and 5 represent a unit 28 that is advantageously used for heating according to the invention combining a burner and oxygen lances. This unit comprises a refractory block 29 provided with a central passage 30 ending flared in the form of a truncated cone 31 whose axis 32 is slanted by about 15 degrees toward the bottom with respect to the horizontal.

This passage 30, flared toward face 41 and intended to be oriented toward the interior of the furnace, elongates opening 33 provided in a composite plate 34 for installing burner 35 (not represented in FIG. 5) with the help of a cylindrical sleeve 36.

Two other passages 37 placed symmetrically, under the axis of the burner, and outside truncated cone 31, are provided for installing, with the help of cylindrical sleeves 38, two oxygen lances (not represented). The axes of these two passages 37 are located at a distance greater than 10 cm from axis 39 of the tip of burner 35. Attachment means 40 are provided to attach composite plate 34 to refractory block 39.

This heating unit makes it possible notably to have a very good regulation of the flame temperature, neither too hot nor too cold. It prevents, in particular, soiling of the tip of the burner, and also a rapid deterioration of the refractory near the tip of the burner.

I claim:

1. A melting furnace for continuous flat glass production comprising:
   a) a glass melting compartment having an upstream wall, a downstream wall and opposite lateral walls connecting the upstream and downstream walls together, said glass melting compartment adapted to contain a quantity of melted glass having an upper surface extending across said glass melting compartment, said glass melting compartment further having:
      i) an upstream part adjacent said upstream wall with at least one upstream feeding opening located in said upstream part, and
      ii) a downstream part adjacent said downstream wall and having a downstream opening for removing melted glass from said glass melting compartment;
   b) at least one forming compartment in communication with said downstream opening and connected to said downstream wall of said glass melting compartment for forming flat glass;
   c) a charging device cooperating with at least one of said upstream feeding openings for feeding vitrifiable material into said glass melting compartment;
   d) at least one burner situated in a burner passage connected to a predetermined wall of said glass melting compartment for feeding fuel and combustible material to said glass melting compartment at a first level above the upper surface of said melted glass, said fuel requiring additional combustive material than that supplied with the fuel in the burner to effect combustion thereof to produce a flame directed along a path; and
   e) a plurality of oxygen lances situated in oxygen passages connected to said predetermined wall of said glass melting compartment for feeding oxygen in a quantity of at least 80% of the combustive material necessary to effect said combustion of the fuel, with at least two oxygen passages with oxygen lances therein being positioned adjacent said at least one burner at a second level above the upper surface of said quantity of melted glass, said second level being below said first level.

2. Furnace according to claim 1, wherein said oxygen lances are placed along said path of the flame for supplying essentially all of the oxygen necessary for said combustion.

3. Furnace according to claim 1, wherein said furnace is equipped with at least one means for sealing against gas flow between said glass melting compartment and said forming compartment.

4. Furnace according to claim 1, wherein at least some of said burners and said oxygen lances point into said glass melting compartment from two rows extending through said lateral walls in alternating relationship.

5. Furnace according to claim 1, wherein said burners are distributed in groups each having a heating power which is regulatable autonomously from one group to the other.

6. Furnace according to claim 1, further comprising auxiliary heating electrodes immersed in the melted glass.

7. Furnace according to claim 1, wherein said predetermined wall is constructed of refractory material and contains a flared burner passage for each of said burners and two oxygen lance passages for each flared burner passage, each of said flared burner passages extending through said refractory material, being flared toward the melting compartment, and having one of said burners disposed therein; and each of said two oxygen lance passages extending through said refractory material at locations spaced from and below said flared burner passage and having one of said oxygen lances disposed therein.

8. Process for continuous flat glass production in a glass melting compartment comprising:

supplying fuel and combustible material from one burner disposed in a burner passage pointed into the interior of said glass melting compartment where said fuel require additional combustive material than that supplied with the fuel in the burner to effect combustion thereof to produce a flame directed along a path; and supplying at least 80% of the combustive material necessary to effect the combustion from two oxygen lances positioned below said burner passage.

9. Process according to claim 8, wherein the temperatures and the position of zones whose temperature level is desired to be controlled are regulated in the melting compartment by separately supplying, on the one hand, most of the oxygen necessary for combustion and, on the other hand, fuel.

10. Process according to claim 8, wherein the flame of a burner is fed by supplying successively, and at different points, the oxygen necessary for combustion.

11. Process according to claim 8, wherein essentially all of the oxygen is supplied separately.

12. Process for melting materials according to claim 8, which comprises rotating the burners from 0 to 20 degrees to control the combustion for heating the materials.

13. Heating unit having at least one refractory block for use as a wall of a furnace having an interior and an axis perpendicular to said wall, said heating unit comprising:

a flared burner passage extending through one of said at least one refractory block wherein said burner passage flares toward the interior of said furnace;

a burner disposed within said flared burner passage for feeding fuel and combustible material, said fuel requiring additional combustive material than that supplied with the fuel in the burner to effect combustion;

two oxygen lance passages extending through said refractory block at locations spaced from and below said flared burner passage;

an oxygen lance disposed within each of said oxygen lance passages for feeding oxygen in a quantity necessary to effect combustion of the fuel, wherein the lances feed oxygen in a quantity of at least 80% of the combustive material necessary to effect combustion of the fuel.

14. Heating unit according to claim 13, wherein said oxygen lance passages are positioned laterally below and on each side of said flared burner passage.

15. Heating unit according to claim 13 wherein said burner passage is cone shaped.

16. Heating unit according to claim 13, wherein said burner is mounted for rotation about said axis.

* * * * *